United States Patent Office 3,441,563
Patented Apr. 29, 1969

3,441,563
PROCESS FOR THE PRODUCTION OF SUBSTITUTED PYRAZOLONES AND OF MONOMETHINE DYESTUFFS THEREOF
Oskar Weissel, Krefeld-Uerdingen, and Roderich Raue and Hubertus Psaar, Leverkusen, Germany, assignors to Farbenfabriken Bayer Aktiengesellschaft, Leverkusen, Germany, a corporation of Germany
No Drawing. Original application Dec. 9, 1959, Ser. No. 858,333. Divided and this application Jan. 5, 1965, Ser. No. 427,205
Claims priority, application Germany, Dec. 12, 1958, F 27,222, F 27,223
Int. Cl. C09b 23/04; C07d 49/14
U.S. Cl. 260—240.2                9 Claims

ABSTRACT OF THE DISCLOSURE

A monomethine dyestuff exemplified by the following formulae and definitions as:

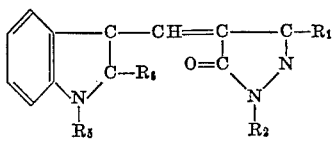

or

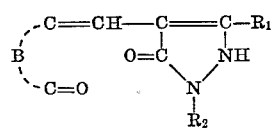

wherein $R_1$ is a member selected from the group consisting of hydrogen, methyl, phenyl, methoxyphenyl, carboxyl, carboxyethyl, carboxy dimethylamide, and carboxy diethylamide, $R_2$ is a member selected from the group consisting of hydrogen, phenyl, methyl phenyl, chlorophenyl, nitrophenyl, carboxyphenyl, amidino and cyanoethyl, $R_5$ is a member selected from the group consisting of hydrogen and methyl, $R_6$ is a member selected from the group consisting of methyl and phenyl; and B is the residue of a cyclic ring such as pyrazolone, pyridazine, or hydantoin.

---

This case is a divisional application of Serial No. 858,333, filed on Dec. 9, 1959, and now abandoned, and is concerned with monomethine dyestuffs.

It is known to produce 4-formyl-pyrazolones-(5) with an unsubstituted 2-position by the reaction of 1,3-disubstituted pyrazolone-(5) derivatives either with phenyl isonitrile followed by hydrolysis of the iso-obtained anile with alkali (M. Passerini and V. Casini, Gazz. Chem. Ital. 67, 332–36) or, using the Reimer-Tiemann reaction, with chloroform and saponifying with alkali the methenyl-bis-pyrazolone obtained with alkali (G. Losco, Gazz. Chem. Ital., 70, 284–86). Furthermore, aldehydes of the kind mentioned can be obtained according to Mr. Ridi (Gazz. Chim. Ital., 71, 542–48) by reacting 3- or 1,3-substituted pyrazolone-(5) derivatives with formamide. Methenyl-bis-pyrazolones are obtained which are hydrolysed in the above-described manner. According to M. Ridi, aldehydes of the type mentioned are also formed by reacting methenyl-bis-pyrazolones with formamide at 200° C. and hydrolysing with alkalins, the 4-aminomethylene-pyrazolones formed under these conditions. According to M. Ridi, the 4-amino-methylene pyrazolones can be obtained by reacting the above mentioned pyrazolones from the very beginning with a large excess of formamide. In this way, there first results the methenyl-bis-pyrazolones which, as already mentioned, react further with excess formamide to give the 4-aminomethylene pyrazolones. Finally, a 4-amino-methylene pyrazolone-(5) derivative is obtained if, according to M. Ridi, 3-phenyl-pyrazolone-(5)-aldehyde-(4) is reacted at 200° C. with formamide.

All these methods for the production of 4-formyl-pyrazolones-(5) with substituted 2-positions and of 4-aminomethylene-pyrazolones-(5) are not very satisfactory and are not suitable for the technical production of these compounds either because difficulty obtainable products are used or the reaction only leads to these products under extreme conditions, such as a large excess of one component and high temperatures. Furthermore, in most cases it is a question of multi-step reactions which are also, to a greater or lesser degree, strongly influenced by side reactions.

It is further known to produce 4-formyl antipyrine by allowing methyl-phenyl-formamide or dimethyl-formamide to react on antipyrine in the presence of phosphorus oxychloride (I. Ito, J. Pharm. Soc. Japan, 76, 167–169).

We have now found that monomethine dyestuffs of the general formulae:

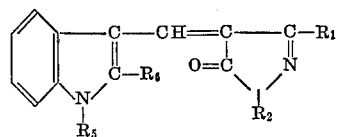

and

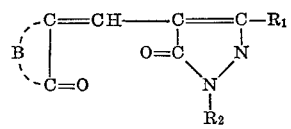

wherein $R_1$ is a member selected from the group consisting of hydrogen, methyl, phenyl, methoxyphenyl, carboxyl, carboxyethyl, carbonamide, carboxy dimethylamide and carboxy diethylamide; $R_2$ is a member selected from the group consisting of hydrogen, phenyl, methyl phenyl, chlorophenyl, nitrophenyl, carboxy phenyl, methoxy phenyl, dimethyl phenyl, methyl-sulfamino phenyl, chloromethyl - sulfamino - substituted phenyl, sulfamino phenyl, methoxy-ethyl-sulfonyl-substituted phenyl, ethyl sulfonyl phenyl, benzene sulfonyl amino, methyl-sulfonyl amino-substituted phenyl, amino phenyl, dichloro phenyl, amidino and cyanoethyl; $R_5$ is a member selected from the group consisting of hydrogen and methyl; $R_6$ is a member selected from the group consisting of methyl and phenyl; and B is a residue of cyclic members selected from the group consisting of barbituric acid, hydantoin, 3,6-di-hydroxypyridazine, and pyrazolones according to the formula:

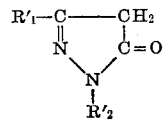

$R'_1$ and $R'_2$ having the significance of $R_1$ and $R_2$ but differing respectively therefrom in each compound, and may be obtained by reacting aldehydes of the general formula:

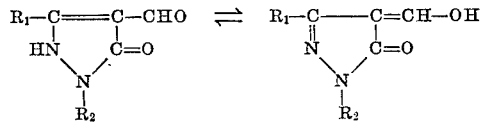

or the functional derivatives of these aldehydes of the general formula:

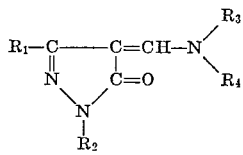

wherein $R_3$ and $R_4$ are members selected from the group consisting of methyl, ethyl, propyl, butyl and phenyl, preferably in the presence of acidic or basic condensation agents, and in the presence or absence of solvents or diluents, with reactive heterocyclic compounds of the general formula:

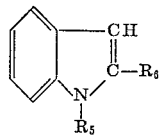

or the general formula:

as above defined.

The smooth and uniform course of reaction of the aldehydes and their derivatives to be used according to the invention with the mentioned reactive heterocyclic compounds under the given conditions was not to be foreseen since in the reaction of the reaction components to be used according to the invention under conditions other than those given, dyestuffs other than those desired are obtained. Thus, for example, according to M. Ridi (Gazz. Chim. Ital., 71, 542–548 (1941)), by melting together α-methyl-indole and 1,3-diphenyl-4-formyl-pyrazolone-(5) there is obtained tri-(α-methyl-indolyl)-methane and methenyl-bis-4-1,3-diphenyl-pyrazolone-(5).

However in the reaction according to the invention of 2-methyl indole with, for example, 1-phenyl-3-methyl-4-formyl-pyrazolone-(5) with the use of acetic anhydride as condensation agent, there is obtained, in very good yield, methenyl-4-(1-phenyl-3-methyl-pyrazolone)-3'-(2'-methyl-indole). Apart from this reaction-guiding effect of the condensation agent used, the velocity of the desired condensation reaction is considerably increased which results in short reaction times and/or low reaction temperatures.

Reactive heterocyclic compounds of the above given formula are, for example, 2-methyl indole and 1-methyl-2-phenyl indole.

Heterocyclic compounds of the above given formula are, for example, barbituric acid,
hydantoin,
3,6-dihydroxypyridazone,
1-phenyl-3-methyl-pyrazolone-(5),
3-methyl-pyrazolone-(5),
1-phenyl-3-(p-methoxyphenyl)-pyrazolone-(5),
1-phenyl-3-carboxyethyl-pyrazolone-(5),
1-phenyl-3-carboxy-pyrazolone-(5),
1-phenyl-3-carbamide-pyrazolone-(5),
1-(p-tolyl)-3-methyl-pyrazolone-(5),
1-(o-chlorophenyl)-3-methyl-pyrazolone-(5),
1-(m-chlorophenyl)-3-methyl-pyrazolone-(5),
1-(p-nitrophenyl)-3-methyl-pyrazolone-(5),
3-methyl-pyrazolone-(5), and
3-(4'-methoxyphenyl)-pyrazolone-(5).

As acid condensation agents there are advantageously used carboxylic acid anhydrides and chlorides, for example, acetic anhydride and acetyl chloride. Other acid condensation agents which may be used include inorganic acid chlorides, such as phosphorus oxychloride and thionyl chloride, concentrated mineral acids, for example, syrupy phosphoric acid, and lower fatty acids, for example, glacial acetic acid.

However, the reaction often takes place in the presence of basic condensation agents, such as piperidine or triethylamine, or in the absence of condensation agents. However, under these conditions the reaction times necessary are, in general, considerably longer. Furthermore, the desired dyestuff formation is partially disturbed by side reactions. In other cases, the desired dyestuff formation does not take place in a noteworthy degree.

As solvent or diluent there can be used the condensation agent employed or also inert compounds, such as aromatic and non-aromatic hydrocarbons, such as benzene, methyl cyclohexane and ligroin, chlorinated aromatic and aliphatic hydrocarbons, such as chlorobenzene and chloroform, as well as aromatic and non-aromatic ethers and alcohols.

In many cases, the reaction even takes place at room temperature. In general, the reaction is advantageously carried out in the temperature range of about 40–120° C.

The new dyestuffs made available by the present process are suitable, as well as the known methine dyestuffs also obtainable by this process, as photo-sensitizers and filter dyestuffs and are mainly intended for these applications.

The following examples are given for the purpose of illustrating the production of the dyestuffs according to the present invention:

EXAMPLE 1

10.1 parts by weight of 1-phenyl-3-methyl-4-formyl-pyrazolone-(5), 6.55 parts by weight of 2-methyl-indole and 30 parts by volume acetic anhydride are heated together under reflux for 10 minutes. The dyestuff crystallises out in the form of dark red crystals upon cooling the intensive orange-coloured solution. Yield: 10.6 parts by weight; melting point: 214–217° C.

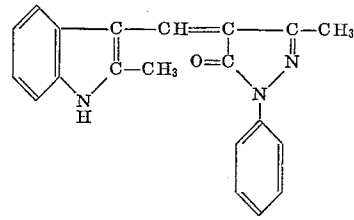

EXAMPLE 2

8.1 parts by weight of 1-phenyl-3-methyl-4-formyl-pyrazolone-(5), 8.3 parts by weight of 1-methyl-2-phenyl-indole and 30 parts by volume of acetic anhydride are heated together to boiling point for 3 minutes. By cooling the intensively orange-coloured reaction mixture, the dyestuff precipitates out in the form of red crystals. It is filtered off with suction and washed with methanol. Yield: 14.7 parts by weight; melting point: 198–201° C.

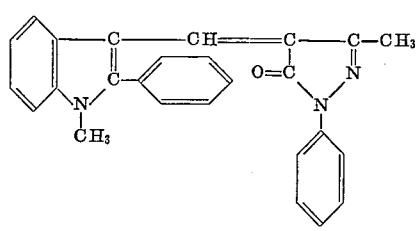

EXAMPLE 3

6.06 parts by weight of 1-phenyl-3-methyl-4-formyl-pyrazolone-(5), 3.48 parts by weight of barbituric acid and 50 parts by volume of acetic anhydride are heated together to boiling point for 30 minutes. Upon cooling, 7.1 parts by weight of the dyestuff crystallise out in the form of bright yellow crystals. These are separated and washed with methanol. Melting point after recrystallisation from dimethyl formamide-water: 308–310° C.

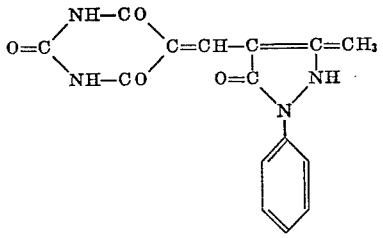

EXAMPLE 4

8.1 parts by weight of 1-phenyl-3-methyl-4-formyl-pyrazolone-(5), 4.5 parts by weight of finely ground 3,6-dihydroxy-pyridazine and 60 parts by volume of acetic anhydride are heated for 5 minutes to 100° C. the orange crystals of the dyestuff, which even precipitate out during the heating, are separated after cooling and washed with methanol. Melting point: 222–228° C. The possible constitution of this dyestuff is:

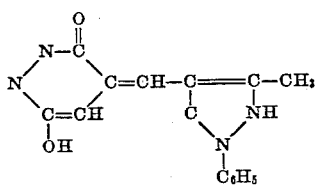

EXAMPLE 5

3.5 parts by weight of 1-phenyl-3-methyl-pyrazolone-(5), 4.0 parts by weight of 1-phenyl-3-methyl-4-formyl-pyrazolone-(5) and 20 parts by volume glacial acetic acid are heated to 50° C., mixed with 30 parts by weight of acetic anhydride and then heated to boiling point for a short time. After cooling, the crystalline slurry obtained is well stirred with 40 parts by volume methanol and filtered off with suction. Yellow crystals are obtained. Yield: almost quantitative; melting point: 176–177° C.

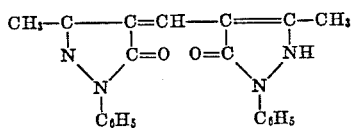

EXAMPLE 6

5.1 parts by weight of 1-phenyl-3-methyl-4-formyl-pyrazolone-(5), 5.0 parts by weight of 1-(p-tolyl)-3-methyl-pyrazolone-(5) and 20 parts by volume of glacial acetic acid are heated to boiling point for five minutes. After cooling, the reaction mixture is diluted with 50 parts by volume methanol and filtered off with suction. The dyestuff is obtained in almost quantitative yield. Melting point: 188–194° C.

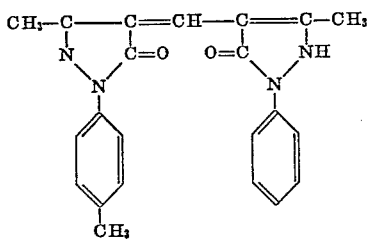

If, instead of the reaction components of this example, equimolar amounts of the 4-formyl-pyrazolones-(5) and 5-pyrazolones which are given in the following table are used, then valuable dyestuff are also obtained, the melting points of which are given in the following table:

| Pyrazolone aldehyde | Pyrazolone | Melting point (° C.) |
|---|---|---|
| 1-phenyl-3-methyl-4-formyl-pyrazolone-(5). | 3-methyl-5-pyrazolone | 262–263 |
| 1-phenyl-3-methyl-4-formyl-pyrazolone-(5). | 1-(2'-methoxyphenyl)-3-methyl-5-pyrazolone. | 205–207 |
| 1-phenyl-3-methyl-4-formyl-pyrazolone-(5). | 1-(2,5'-dichlorophenyl)-3-methyl-5-pyrazolone. | 225–228 |
| 1-phenyl-3-methyl-4-formyl-pyrazolone-(5). | 1-(4'-nitrophenyl)-3-methyl-5-pyrazolone. | 278–280 |
| 1-phenyl-3-methyl-4-formyl-pyrazolone-(5). | 1-(3'-carboxyphenyl)-3-methyl-5-pyrazolone. | 224–246 |
| 1-phenyl-3-methyl-4-formyl-pyrazolone-(5). | 1-(4'-aminophenyl)-3-methyl-5-pyrazolone. | 227–229 |
| 1-phenyl-3-methyl-4-formyl-pyrazolone-(5). | 1-phenyl-5-pyrazolone-3-carbonamide. | 270–273 |
| 1-phenyl-3-methyl-4-formyl-pyrazolone-(5). | 1-(3'-sulphoneamino-phenyl)-3-methyl-5-pyrazolone. | 286–288 |
| 1-phenyl-3-methyl-4-formyl-pyrazolone-(5). | 1-(3'-methylsulphenyl-amino-phenyl)-3-methyl-5-pyrazolone. | 189–195 |
| 1-phenyl-3-methyl-4-formyl-pyrazolone-(5). | 1-(3'-benzenesulphenyl-amino-phenyl)-3-methyl-5-pyrazolone. | 200–202 |
| 1-phenyl-3-methyl-4-formyl-pyrazolone-(5). | 1-(3'-ethylsulphenyl-phenyl)-3-methyl-5-pyrazolone. | 245–247 |
| 1-phenyl-3-methyl-4-formyl-pyrazolone-(5). | 1-(2'-methoxy-5'-ethyl-sulphenylphenyl)-3-methyl-5-pyrazolone. | 179–186 |
| 1-phenyl-3-methyl-4-formyl-pyrazolone-(5). | 1-(4'-sulphaminophenyl)-3-methyl-5-pyrazolone. | 277–279 |
| 1-phenyl-3-methyl-4-formyl-pyrazolone-(5). | 1-(2'-chloro-6'-methyl-4'-sulphaminophenyl)-3-methyl-5-pyrazolone. | 276–278 |
| 1-phenyl-3-methyl-4-formyl-pyrazolone-(5). | 1-(2'-methyl-5'-sulphamino-phenyl)-3-methyl-5-pyrazolone. | 221–227 |
| 1-phenyl-3-methyl-4-formyl-pyrazolone-(5). | 1-(2',6'-dimethyl-3'-sul-phaminophenyl)-3-methyl-5-pyrazolone. | 249–255 |
| 1-phenyl-3-carboxy-4-formyl-pyrazolone-(5). | 1-phenyl-3-methyl-5-pyrazolone. | 227–229 |
| 1-phenyl-3-carboxylic-acid-4-formyl-pyrazolone-(5). | 3-methyl-5-pyrazolone | 245–247 |
| 5-methyl-4-formyl-pyra-zolone-(5). | 1-(2'-methoxyphenyl)-3-methyl-5-pyrazolone. | 266–268 |

EXAMPLE 7

5.0 parts by weight of 1-phenyl-3-methyl-4-formyl-pyrazolone-(5), 5.3 parts by weight of 1-phenyl-3-(p-methoxyphenyl)-pyrazolone-(5) and 30 parts by volume of acetic anhydride are heated to boiling point for 5 minutes. After cooling, the crystalline slurry obtained is stirred with 50 parts by volume methanol and filtered off with suction. The dyestuff is obtained in the form of a yellow crystalline powder. Yield: 8.2 parts by weight, melting point: 208–210° C.

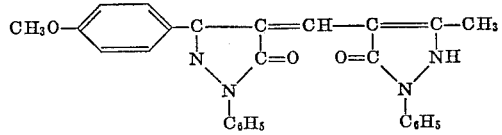

EXAMPLE 8

By the reaction of 3.5 parts by weight of 1-(p-tolyl)-3-methyl-pyrazolone-(5) with 5.7 parts by weight of 1-phenyl-3-carbethoxy-4-dimethyl-aminomethylene - pyrazolone-(5) in the manner described in Example 6, the dyestuff is obtained in an almost quantitative yield. Melting point: 193–195° C.

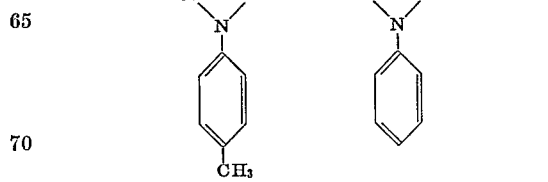

If, instead of with 1-(p-tolyl)-3-methyl-pyrazolone-(5), 1-phenyl - 3 - carbethoxy - 4 - dimethylaminomethylene-pyrazolone-(5) is reacted with the equivalent amounts of one of the pyrazolones given in the following table under otherwise identical conditions, then similar valuable dyestuffs are obtained.

| Pyrazolone: | Melting point, °C. |
|---|---|
| 1-phenyl-3-methyl-pyrazolone-(5) | 157–165 |
| 3-methyl-pyrazolone-(5) | 196–198 |
| 1-(3'-carboxyphenyl)-3-methylpyrazolone-(5) | 295–299 |
| 1-phenyl-3-carboxylic acid amide-pyrazolone-(5) | 175–276 |
| 1-(3'-sulphaminophenyl)-3-methyl-pyrazolone-(5) | 206–208 |
| 3-methoxyphenyl-pyrazolone-(5) | 204–206 |

We claim:
1. A monomethine dyestuff of the formula:

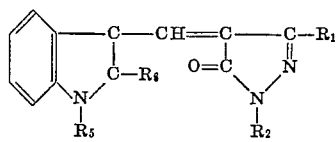

wherein $R_1$ is a member selected from the group consisting of hydrogen, methyl, phenyl, methoxyphenyl, carboxyl, carboxyethyl, carboxy dimethylamide, and carboxy diethylamide; $R_2$ is a member selected from the group consisting hydrogen, phenyl, methyl phenyl, chlorophenyl, nitrophenyl, carboxyphenyl, amidino and cyanoethyl; $R_5$ is a member selected from the group consisting of hydrogen and methyl; and $R_6$ is a member selected from the group consisting of methyl and phenyl.

2. Methenyl-4-[1-phenyl-3-methyl-pyrazolone-(5)]-3'-[2'-methyl-indole].
3. Methenyl-4-[1-phenyl-3-methyl-pyrazolone-(5)]-3'-[1'-methyl-2'-phenyl-inodole].
4. Methenyl-4-[1-phenyl-3-methyl-pyrazolone-(5)]-4'-[3',6'-dihydroxypyridazine].
5. Methenyl-4-[1-phenyl-3-methyl-pyrazolone-(5)]-4'[1phenyl-3'-(p-methoxyphenyl)-pyrazolone-(5')].
6. Methenyl-4-[1-phenyl-3-carboxyethyl-pyrazolone-(5)]-4'-[1'phenyl-3'-methyl-pyrazolone-(5')].
7. Methenyl-4-[1-phenyl-3-carboxyethyl-pyrazolone-(5)]-4'-[1'-(p-tolyl)-3-methyl-pyrazolone-(5')].
8. Methenyl-4-[1phenyl-3-carboxyethylpyrazolone-(5)]-4'-[3'-(4''-methoxyphenyl-pyrazolone-(5)].

9. A dyestuff of the formula

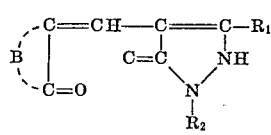

wherein $R_1$ is methyl, phenyl, methoxyphenyl, carboxyl, carboxyethyl, carboxy dimethylamide, carbonamide and carboxy diethylamide; $R_2$ is a member selected from the group consisting of hydrogen, phenyl, methyl phenyl, chlorophenyl, nitrophenyl, carboxyphenyl, methoxy phenyl, dimethyl phenyl, methyl sulfamino phenyl, chloromethyl-sulfamino phenyl, sulfamino phyenyl, methoxy-ethyl-sulfonyl-phenyl, ethyl sulfonyl phenyl, benzenesulfonyl amino, methyl-sulfonyl amino phenyl, amino phenyl, dichloro phenyl, amidino and cyanoethyl; and B is the residue of a cyclic ring selected from the group consisting of hydantoin, 3, 6-dihydroxy pyridazine and

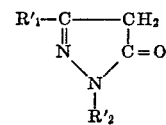

wherein $R'_1$ is carboxy ethyl and $R'_2$ is defined as in $R_2$, $R'_1$ and $R'_2$ differing from $R_1$ and $R_2$.

References Cited
UNITED STATES PATENTS
2,369,355  2/1945  Kendall et al. _____ 260—240.4

FOREIGN PATENTS
1,034,677  4/1953  France.
1,240,930  8/1960  France.

OTHER REFERENCES
Hunig: Annalen der Chemie, vol. 574, pp. 106–112 (1951).
Ridi et al.: Gazz. Chim. Ital., vol. 83, pp. 36–43 (1953).
Ito: J. Pharm. Soc. Japan, vol. 76, pp. 167–169 (1956).

JOHN D. RANDOLPH, *Primary Examiner.*

U.S. Cl. X.R.

96—106; 260—240.4, 310, 319.1

UNITED STATES PATENT OFFICE
CERTIFICATE OF CORRECTION   PAGE - 1

Patent No. 3,441,563     Dated April 29, 1969

Inventor(s) Oskar Weissel, Roderich Raue and Hubertus Psaar

It is certified that error appears in the above-identified patent and that said Letters Patent are hereby corrected as shown below:

Column 1, lines 20-27, the formula should appear as shown below:

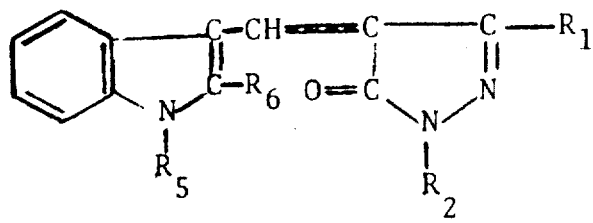

lines 28-34, that portion of the formula reading

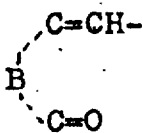   should read   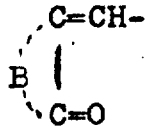

Col. 5, lines 25-34, that portion of the formula reading

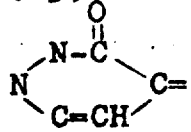   should read   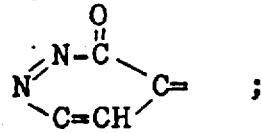 ;

lines 45-50, that portion of the formula reading

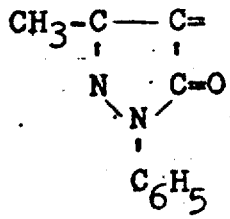   should read   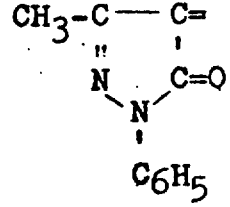

line 53, "5.1" should read -- 5.4 --.

Col. 5, lines 61-72, that portion of the formula reading
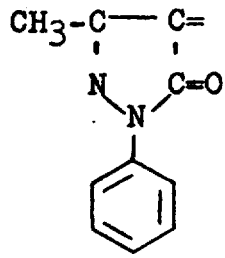     should read     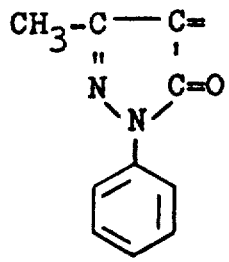
Col. 6, lines 48-53, that portion of the formula reading
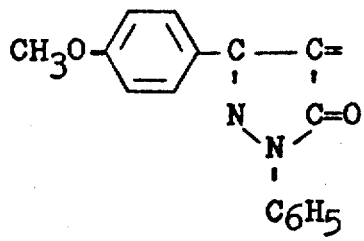     should read     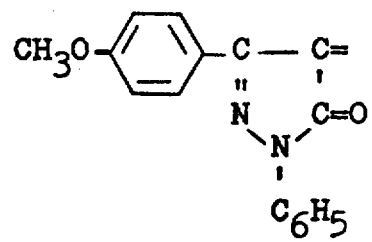
Col. 7, lines 17-23, that portion of the formula reading
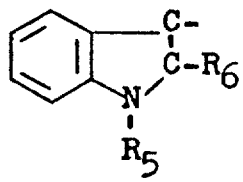     should read     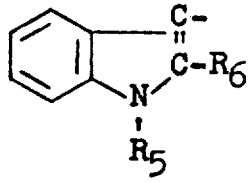
Col. 8, lines 2-7, that portion of the formula reading
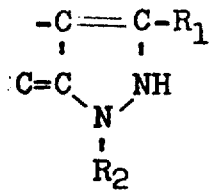     should read     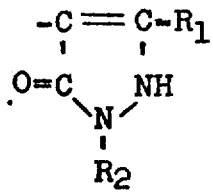

3,441,563

(3)

Col. 8, line 14, "sulfamino phyenyl" should read
-- sulfamino phenyl --.

Signed and sealed this 4th day of August 1970.

(SEAL)
Attest:

EDWARD M. FLETCHER, JR.  
Attesting Officer

WILLIAM E. SCHUYLER, JR.  
Commissioner of Patents